Nov. 3, 1964     E. W. FISHER     3,155,566
LOW FRICTION MATERIAL AND DEVICE
Filed June 13, 1960

*INVENTOR.*
EDWARD W. FISHER
BY John P. Murphy
ATTORNEY

United States Patent Office 3,155,566
Patented Nov. 3, 1964

3,155,566
LOW FRICTION MATERIAL AND DEVICE
Edward W. Fisher, Palmyra, N.Y., assignor to Garlock Inc., Palmyra, N.Y., a corporation of New York
Filed June 13, 1960, Ser. No. 35,644
12 Claims. (Cl. 161—95)

This invention relates to low friction materials and devices, and more particularly relates to the structure of and methods for making low friction bearings, seals, packings and devices.

Low friction plastic materials have had very limited use as bearings, seals, pistons, and the like for various reasons, including failure at low temperature, cold-flow, change in physical characteristics when subject to heat and pressure, and the lack of suitable bonding characteristics.

The present invention employs plastic materials which themselves have low friction characteristics, and also makes use of the fact that useful low friction surfaces are produced if plastic materials having relatively low friction characteristics are prepared in the form of woven fibers.

Materials having desirable low friction characteristics suitable for use in bearings, seals, pistons, and the like include polymeric fluorocarbon resins, such as tetrafluoroethylene, marketed under the trade name "Teflon," polytrifluorochloroethylene, marketed under the trade name "Kel-F," and a copolymer of tetrafluoroethylene and hexafluoropropylene, known by the Du Pont Company's trade name "Teflon 100–X." Difficulties have been encountered in using these low friction materials in solid form. In bearing and sealing applications failure occurs when the low friction surface materials cold-flow, spall, melt, or seize during use.

Considerable improvement, on the other hand, has been achieved by the use of woven fibers of these low friction materials. This improvement results to a large extent from the fact that the molecules in the filament form are oriented, as compared to the unoriented molecules in molded or sintered sheets. The improvement achieved by resorting to the use of fibers is attributable in part to their stronger tensile strength over that of sheet material fabricated from the same material, or similar material. For example, in the case of tetrafluoroethylene resins, the tensile strength is approximately twenty-five times greater than the tensile strength of the material in sheet or molded form.

In general, low friction polymeric fluorocarbon fiber materials do not bond readily with other materials. In order to obtain a good bond with a backing material, bondable fibers have sometimes been interwoven with low friction fibers so that on the working face, a low friction surface will be provided, and on the opposite face a bondable surface will be present. For example, inherent resistance to bonding is possessed by the polymeric fluorocarbon resins, and these fibers have been interwoven on a conventional backing material such as cotton, rayon, wool, glass and the like, in such a manner that the working surface carries uniformly distributed fluorocarbon resin fibers on its surface. Still others have resorted to activation of the low friction surfaces of sheet material so as to render it adhesive to other materials. Briefly, one such method has involved contacting the polymer surface with a metal reactive selected from the class consisting of alkali metals, the alkaline earth metals, manganese and zinc, at a temperature sufficient to cause reaction between the metal and the polymer, the reaction being confined to the surface and rendering it active toward organic adhesive coatings without degrading the bulk of the polymer. The resort to the use of an externally applied backing material and the additional problems of bonding or cementing the externally applied backing material to fabrics formed of low friction material fibers has not been satisfactory for many applications. A great disadvantage, for example, is incurred by diluting the base fabric with bondable fibers since valuable low friction fibers are thus removed by the replacement and the life of the product is considerably reduced.

Low friction bearing materials have also been made, as disclosed in U.S. Patent No. 2,907,612, having a barrier layer disposed on the rear face of the cloth or fabric of Teflon, or other low friction resin material, to prevent any of the backing material, usually rubber, from passing up through the interstices of the Teflon cloth. Such barrier material is a bondable resin having a modified chain which will bond to the threads of the low friction cloth material, or the low friction resin material has bondable cords woven on the underside thereof which readily bond to the carrier, such as cured latex.

Accordingly, it is an object of this invention to provide an improved bearing or sealing material or device.

It is another object of this invention to provide a bearing or sealing material or device of simpler construction than has been heretofore possible.

Another object is to provide a bearing or sealing material or device formed of woven low friction material fibers without the need of an external backing material.

According to the present invention, it has been found that the aforesaid objects are achieved by making a yarn of low friction polymeric fluorocarbon fiber materials, and weaving said yarn into a cloth composed entirely of such low friction material, painting, skimming, coating, or frictioning such cloth with an elastomeric type compound and bonding the treated cloth with rubber or other plastic material, as has been well known in the art for many years, so as to obtain a facing of low-friction polymeric fluorocarbon fiber material. Such base or core material may be homogeneous, or reinforced, rubber or other plastic material, or it may be layers of duck, asbestos, or glass cloth suitably bonded together to form the base or core material in a well known manner. Alternatively, the polymeric fluorocarbon cloth can be treated by contacting the surface with an alkali metal, specifically, sodium metal dissolved in anhydrous ammonia, for example, as described in U.S. Patent 2,789,063, to condition the surface of such cloth for adherence to the impregnating elastomeric binder.

Other objects and features of novelty of the invention will be specifically pointed out and will become apparent when referring, for a better understanding of the invention, to the following description taken in conjunction with the accompanying drawings, wherein.

Figure 1:
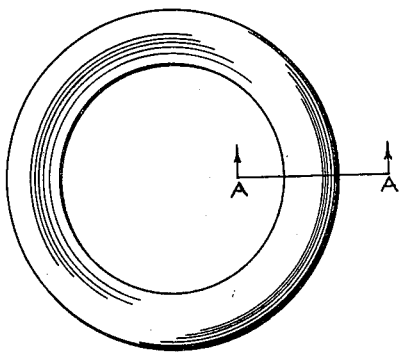
FIGURE 1 illustrates in planar view one embodiment of the present invention in the form of a bearing or sealing device.
Figure 4:
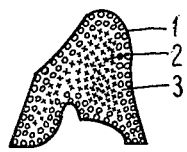
FIGURE 4 illustrates a cross-sectional view of the embodiment.
Figure 2:
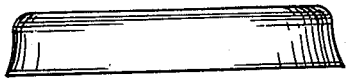
FIGURE 2 is a side elevation of the embodiment of FIGURE 1.
Figure 5:
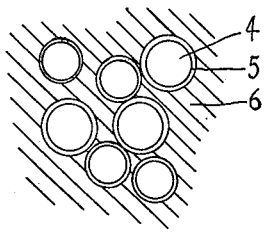
FIGURE 5 is a fragmentary, highly magnified view showing the end section of some fibers, the view being a portion only of the embodiment shown in FIGURE 4.
Figure 3:
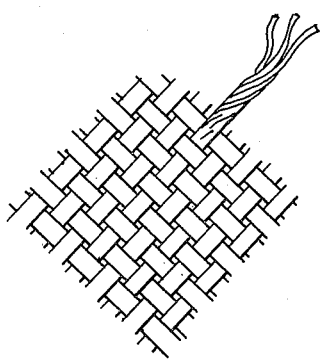
FIGURE 3 is a fragmentary exploded view of the fabric used, illustrating a twisted yarn and its fibers or filaments.

Referring to FIGURE 1, there is shown one form of bearing or sealing device making use of the present invention. In particular, FIGURES 1 and 2 illustrate various views of packing formed of Teflon yarn impregnated with a resilient material such as an elastomer. FIGURE 3 illustrates one method of weaving low friction material fibers into a fabric. FIGURE 4 is a cross-sectional view of the packing of FIGURE 1 taken on cut AA. In FIGURE 4, the bearing, or sealing device is made up of a reinforced elastomeric core 2, an outer low friction fabric material 1, having a sensitized bondable surface 3. FIGURE 5 illustrates a technique for bonding low friction material fibers to elastomeric material.

Oriented fibers of Teflon tend to resist cold-flow, spalling, or seizing during use which would occur if the low friction material were employed in solid form. The oriented fibers are woven into a fabric, which is layered to a desired height, cut, and formed, as shown in FIGURE 4, by temperature and pressure, to a preferred three dimensional shape as shown in FIGURE 1, and the interstices between the fibers in the woven pattern are filled with the elastomeric material to hold the fibers in a continuous working position. During loading of the packing material, the elastomeric material tends to maintain the fibers in their relative positions and hence insure proper functioning of the packing material. Thus the Teflon fibers carry the load in a soft material, allowing the packing material to adjust to pressure and other environmental changes. Various types of weaves may be employed for forming the fabric of low friction fibers. For example, when the fabric is employed for faces of seals, the bodies of which are required to have elastomeric properties, the low friction material fibers must be able to expand and contract with the elastomeric material and should offer no resistance to the application of pressure by the material of this seal.

FIGURE 3 illustrates a flat fabric employing one method of weave. Analysis of FIGURE 3 shows that the fibers formed of Teflon are interlocked by the weave pattern. To maintain these fibers in the preferred positions, applicant introduces an elastomeric material, such as rubber, into the interstices between the fibers. For example, in building up the three dimensional device, such as shown in FIGURES 1 and 2, one or more layers of Teflon fabric are applied over a suitable core, and the structure maintained in a continuous working position with a flexible material such as rubber. In some instances it may be desirable to eliminate the core, as in very small cross section rings. By preserving the interstices, the elastomeric material can be introduced to contact the low friction material cloth and bond the yarns in place mechanically to the point that, when subjected to use, they will not be deformed or displaced with respect to one another. The resultant product is a bearing or sealing device or material of simpler construction than has been heretofore possible to obtain exhibiting resistance to deformation and having the ability to retain its shape and properties under varying working temperatures and pressure conditions.

The weave herein illustrated, therefore, is merely shown by way of example and not by a limitation, as it is to be understood that in different applications, different types of weaves may be employed.

In certain applications when the pressure and temperature conditions during use subject the woven low friction material of fiber to severe distortions, it may be desirable to impregnate the interstices of the woven fabric with a material which may not bond well to the woven fibers. In this case, resort may be made to practices of sensitizing the surface of the low friction fabric material so that it will bond to the impregnant which in turn is bonded to the resilient backing material or core, such as rubber or fibrous laminate. This is illustrated in FIGURE 5, in which 4 constitutes the woven low friction fibers, 5 constitutes the sensitized surface, and 6 constitutes the impregnant.

While a specific embodiment has been shown and described, it will, of course, be understood that various modifications may yet be devised by those skilled in the art which will embody principles of the invention, and therefore fall within the scope thereof.

It is claimed:

1. A low friction device having a bearing surface comprising an elastomeric core material and outer low friction fabric material consisting of a polymeric fluorocarbon, said low friction fabric material in a woven configuration, and said elastomeric material dispersed throughout the interstices of said fabric material, such that the bearing surface formed by said fabric material has the ability to retain its shape and properties under varying working temperature and pressure conditions.

2. A low friction device having a bearing surface comprising an elastomeric core material and outer low friction fabric material consisting of polytetrafluoroethylene, said low friction fabric material in a woven configuration, and said elastomeric material dispersed throughout the interstices of said fabric material, such that the bearing surface formed by said fabric material has the ability to retain its shape and properties under varying working temperature and pressure conditions.

3. A low friction device having a bearing surface comprising an elastomeric core material and outer low friction fabric material consisting of a copolymer of tetrafluoroethylene and hexafluoropropylene, said low friction fabric material in a woven configuration, and said elastomeric material dispersed throughout the interstices of said fabric material, such that the bearing surface formed by said fabric material has the ability to retain its shape and properties under varying working temperature and pressure conditions.

4. A low friction device having a bearing surface comprising an elastomeric core material and outer low friction fabric material consisting of polytrifluorochloroethylene, said low friction fabric material in a woven configuration, and said elastomeric material dispersed throughout the interstices of said fabric material, such that the bearing surface formed by said fabric material has the ability to retain its shape and properties under varying working temperature and pressure conditions.

5. A low friction device having a bearing surface comprising a reinforced elastomeric core material and outer low friction fabric material consisting of a polymeric fluorocarbon, said low friction fabric material in a woven configuration, and said elastomeric material dispersed throughout the interstices of said fabric material, such that the bearing surface formed by said fabric material has the ability to retain its shape and properties under varying working temperature and pressure conditions.

6. A low friction device having a bearing surface comprising a reinforced elastomeric core material and outer low friction fabric material consisting of polytetrafluoroethylene, said low friction fabric material in a woven configuration, and said elastomeric material dispersed throughout the interstices of said fabric material, such that the bearing surface formed by said fabric material has the ability to retain its shape and properties under varying working temperature and pressure conditions.

7. A low friction device having a bearing surface comprising a reinforced elastomeric core material and outer low friction fabric material consisting of a copolymer of tetrafluoroethylene and hexafluoropropylene, said low friction fabric material in a woven configuration, and said elastomeric material dispersed throughout the interstices of said fabric material, such that the bearing surface formed by said fabric material has the ability to retain its shape and properties under varying working temperature and pressure conditions.

8. A low friction device having a bearing surface comprising a reinforced elastomeric core material and outer low friction fabric material consisting of polytrifluorochloroethylene, said low friction fabric material in a woven configuration, and said elastomeric material dispersed throughout the interstices of said fabric material, such that the bearing surface formed by said fabric material has the ability to retain its shape and properties under varying working temperature and pressure conditions.

9. A low friction device having a bearing surface comprising an elastomeric core material and outer low friction fabric material consisting of a polymeric fluorocarbon, said low friction fabric material in a woven configuration, and said elastomeric material dispersed throughout the interstices of said fabric material, and bonded thereto, such that the bearing surface formed by said fabric material has the ability to retain its shape and properties under varying working temperature and pressure conditions.

10. A low friction device having a bearing surface comprising an elastomeric core material and outer low friction fabric material consisting of polytetrafluoroethylene, said low friction fabric material in a woven configuration, and said elastomeric material dispersed throughout the interstices of said fabric material, and bonded thereto, such that the bearing surface formed by said fabric material has the ability to retain its shape and properties under varying working temperature and pressure conditions.

11. A low friction device having a bearing surface comprising an elastomeric core material and outer low friction fabric material consisting of a copolymer of tetrafluoroethylene and hexafluoropropylene, said low friction fabric material in a woven configuration, and said elastomeric material dispersed throughout the interstices of said fabric material, and bonded thereto, such that the bearing surface formed by said fabric material has the ability to retain its shape and properties under varying working temperature and pressure conditions.

12. A low friction device having a bearing surface comprising an elastomeric core material and outer low friction fabric material consisting of polytrifluorochloroethylene, said low friction fabric material in a woven configuration, and said elastomeric material dispersed throughout the interstices of said fabric material, and bonded thereto, such that the bearing surface formed by said fabric material has the ability to retain its shape and properties under varying working temperature and pressure conditions.

References Cited in the file of this patent

UNITED STATES PATENTS

| | | |
|---|---|---|
| 2,639,198 | Kirkham | May 19, 1953 |
| 2,723,932 | Ross et al. | Nov. 15, 1955 |
| 2,765,023 | Fagg et al. | Oct. 2, 1956 |
| 2,892,650 | Runton | June 30, 1959 |
| 2,906,552 | White | Sept. 29, 1959 |
| 2,907,612 | White | Oct. 6, 1959 |
| 3,033,623 | Thomson | May 8, 1962 |